// United States Patent [15] 3,691,537
Burgess et al. [45] Sept. 12, 1972

[54] HIGH SPEED SIGNAL IN MOS CIRCUITS BY VOLTAGE VARIABLE CAPACITOR

[72] Inventors: James F. Burgess; Constantine A. Neugebauer, both of Schenectady, N.Y.

[73] Assignee: General Electric Company

[22] Filed: May 26, 1971

[21] Appl. No.: 146,968

[52] U.S. Cl................340/173 R, 307/238, 307/279, 340/173 CA

[51] Int. Cl...........................G11c 11/24, G11c 11/40

[58] Field of Search.....340/173 R, 173 AM, 173 FF, 340/173 OR, 173 CA; 307/238, 279

[56] References Cited

UNITED STATES PATENTS 3,286,189 11/1966 Mitchell....................340/173

*Primary Examiner*—Terrell W. Fears
*Attorney*—Richard R. Brainard, Paul A. Frank, Charles T. Watts, Paul F. Wille, Frank L. Neuhauser, Oscar B. Waddell and Joseph B. Forman

[57] ABSTRACT

Voltage losses, and consequent reduced transconductance, can be overcome in metal-oxide-semiconductor (MOS) circuits by the use of a voltage variable coupling capacitor comprising a drain and a gate electrode. Since the capacitor is voltage variable, selective coupling is obtainable. In a dynamic memory cell, a voltage variable capacitor connected to the storage node selectively couples enabling to the storage node to increase the transconductance of the read transistor. Selective coupling is also used in apparatus ancillary to the memory cell to enhance the "refresh" operation. A flip-flop type of memory is also disclosed in which an enhanced output signal is obtained by selective coupling.

6 Claims, 3 Drawing Figures

PATENTED SEP 12 1972 3,691,537

INVENTORS:
JAMES F. BURGESS
CONSTANTINE A. NEUGEBAUER
by Paul F. Wille
THEIR ATTORNEY

HIGH SPEED SIGNAL IN MOS CIRCUITS BY VOLTAGE VARIABLE CAPACITOR

This invention relates to metal-oxide-semiconductor (MOS) circuits, and in particular to a voltage variable capacitor for selectively coupling signals to a storage node in such circuits.

In MOS circuits, allowances must be made for what are known as threshold voltage losses within the particular circuit. These threshold losses arise from the nature of the MOS transistor itself, with the result that MOS circuits require higher operating voltages than bipolar circuits.

In an MOS transistor, the source and drain electrodes comprise regions of a first type conductivity semiconductor in a substrate of a second type conductivity semiconductor. Overlying the portion of the substrate separating the source and drain regions is a gate structure comprising an insulating layer and a metal layer thereover. To activate or turn on the transistor, the voltage applied to the gate electrode must exceed the voltage of one of the regions by one threshold voltage. When the threshold voltage is exceeded, an inversion layer forms under the gate electrode, electrically coupling the regions together.

Since most MOS transistors are symmetrical, the source and drain regions cannot be physically distinguished. However, the regions are generally electrically distinguished in that the region having the lower voltage is considered the source. Thus, the voltage on the gate must exceed the voltage on the source by one threshold value. The threshold value depends upon the characteristics of the semiconductor, the insulating layer and the gate, but is generally between 1 and 3 volts. Other effects, such as backbiasing, may raise the threshold value of the transistor to 4 or 5 volts. In any event, attempts to raise the source voltage to closer than one threshold of the gate voltage will turn off the transistor.

In a circuit containing several transistors, an input signal may undergo two or three threshold losses. This deterioration has at least three effects: the circuit voltage is lowered, the transconductance of the transistors is lowered and the operating speed of the circuit is lowered.

In MOS memories, for example, these are serious matters since the memory is therefore relatively slow or, worse, the information may be lost. In one type of MOS memory, charge is stored on the gate electrode of a "storage" transistor to represent, for example, a logic "1." Readout is accomplished by applying a signal to the gate of a "read" transistor in series with the storage transistor. If the storage transistor is turned on, i.e., if charge is stored, current will flow through the read and storage transistors to discharge an access line. The access line is then monitored to determine whether or not the storage transistor is in the active state.

The access lines to the memory cells exhibit capacitance. This capacitance must be discharged through a resistance represented by the read and storage transistors in series. There is, therefore, a RC time constant associated with the memory operation that must be made relatively small to assure short operation times.

However, due to threshold losses, the voltage level stored on the gate electrode of the storage transistor is not as high as the initial level of the signal to be stored. Further, the voltage level on the gate becomes reduced with time through leakage currents from the storage node. These effects combine to reduce the transconductance of the storage transistor so that when a read pulse is applied to the gate of the read transistor, the series resistance is relatively high. This, in turn, increases the time it takes for the monitored access line to discharge to a predetermined voltage level, at which it can be said with some degree of certainty that a logic "1" is stored.

In general, if the voltage on the gate of the storage transistor could be raised, albeit temporarily, then the transconductance could go higher, thereby overcoming the threshold losses.

In view of the foregoing, it is therefore an object of the present invention to provide a means for increasing the transconductance of an MOS transistor.

Another object of the present invention is to reduce or eliminate the effect of threshold losses in MOS circuitry.

A further object of the present invention is to provide a means for selectively coupling signals to and from isolated nodes in an MOS circuit.

The foregoing objects are achieved in the present invention wherein there is provided a voltage variable capacitor comprising a separate drain region and a gate electrode partially overlying the drain region. One or more of these capacitors are utilized to couple signals to and from storage nodes within the MOS circuit.

Each voltage variable capacitor has a high or a low capacitance state depending upon the voltage of the node to which the gate electrode is connected. As with a MOS transistor, a voltage in excess of the threshold voltage "turns on" the voltage variable capacitor and induces an inversion layer in the semiconductor substrate underneath the gate structure. Access to the inversion layer is obtained by the drain region which the gate structure partially overlies. The gate and inversion layer thus form two plates of a capacitor, the capacitance of which is determined by the gate area and the nature of the insulating layer. For example, using silicon dioxide as the insulator and molybdenum as the metal layer thereover to form the gate structure, a capacitance of approximately 0.23 pf/mil$^2$ is obtained.

In the off condition, the capacitance exhibited by the voltage variable capacitor is at a minimum, limited to that produced by the area of overlap between the gate and drain.

A complete description of the structure and operation of the voltage variable capacitor in several embodiments is contained in application Ser. No. 146,966 filed concurrently herewith and assigned to the assignee of the present invention. The present invention also relates to application Ser. No. 146,969 filed concurrently herewith and assigned to the assignee of the present invention. Application Ser. No. 146,969 discloses and claims a three transistor memory cell wherein a MOS voltage variable capacitor is used to increase the output signal from the storage transistor. In addition, due to the configuration of the cell, the cell can be self-refreshed.

In the present invention, a MOS voltage variable capacitor is used to selectively couple signals in MOS circuits.

A more complete understanding of the present invention may be obtained by considering the following detailed description in conjunction with the accompanying drawings, in which.

Figure 1:
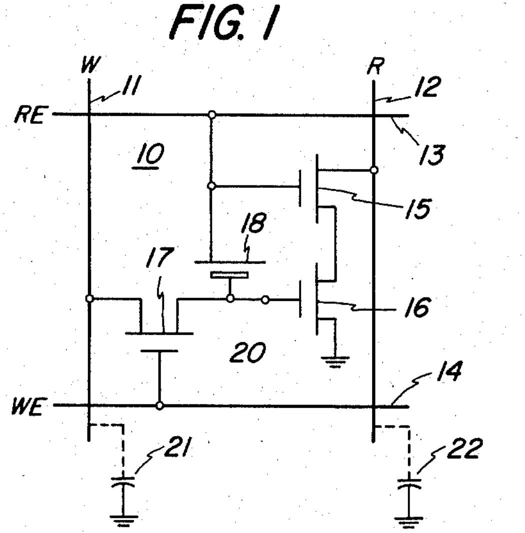
FIG. 1 illustrates one embodiment of the present invention in a three transistor memory cell.

Referring to FIG. 1, there is illustrated a three-transistor memory cell 10 in accordance with the present invention. Specifically, memory cell 10 is bordered by access lines 11, 12, 13 and 14 which are additionally, and arbitrarily, designated write, read, read-enable and write-enable respectively.

Connected between read line 12 and ground are transistors 15 and 16 which are series connected. The gate of transistor 16 provides a charge storage node 20. Connecting write line 11 to storage node 20 is transistor 17. The gate of transistor 17 is connected to write enable line 14. The gate of transistor 15 is connected to read enable line 13. Interconnecting read enable line 13 and storage node 20 is voltage variable capacitor 18 comprising a gate structure connected to storage node 20 and a drain electrode connected to read enable line 13.

In addition to storage, memory cell 10 performs three basic functions, namely, WRITE, READ and REFRESH. It is necessary to refresh or replenish the information on storage node 20 due to the leakage of charge from storage node 20 through the reverse biased p-n junction formed by the source of transistor 17. The WRITE and READ operations will be described in conjunction with FIG. 1. The REFRESH operation is best described in conjunction with FIG. 2 in which the necessary ancillary apparatus is also illustrated.

To write in memory cell 10 of FIG. 1, write line 11 has the capacitance associated therewith, represented in FIG. 1 by capacitor 21, charged by a suitable pulse of current. Write enable line 14 is then raised in voltage to turn on transistor 17 thereby providing a resistive path interconnecting write line 11 and storage node 20. When the charging of storage node 20 is completed, write enable line 14 is lowered thereby isolating storage node 20 from write line 11. Assuming the storing of a charge on storage node 20 represents a logic "1," the storage of a logic "1" raises the gate of transistor 16 and voltage variable capacitor 18 above the threshold voltage. Turning on transistor 16 has no immediate effect since the source-drain path of transistor 16 is isolated from read line 12 by transistor 15. Also, raising the gate of voltage variable capacitor 18 above the threshold voltage has no immediate effect in the absence of a pulse on read enable line 13.

When it is desired to read the information stored in memory cell 10, read line 12 has the capacitance associated therewith, represented by capacitor 22, charged and the voltage on line 12 is monitored to determine whether a logic "0" or a logic "1" has been stored in memory cell 10. Assuming a logic "1" has been stored, transistor 16 is turned on and voltage variable capacitor 18 is in a high capacitance state. Therefore, when a pulse is applied on read enable line 13, transistor 15 is also turned on, opening the resistive path to ground from line 12 through transistors 15 and 16.

In a typical three transistor cell of the prior art, without the benefit of the voltage variable coupling of the present invention, one must observe the voltage of read line 12 for a given length of time in order to be sure that the resistive path formed by transistors 15 and 16 has had sufficient time to discharge read line 12. Due to the fact that the charge stored on storage node 20 may have been partially dissipated through the p-n junction formed by the source of transistor 17, transistor 16 may not be turned on as fully as necessary in order to obtain a rapid discharge of read line 12. However, due to the fact that voltage variable capacitor 18 is above threshold, exhibiting a large capacitive coupling between line 13 and storage node 20, the pulse applied to read enable line 13 is coupled by voltage variable capacitor 18 to the storage node 20. At storage node 20 this coupled voltage pulse is additively combined with the voltage at the storage node to more fully turn on transistor 16 and increase its transconductance, thereby enabling read line 12 to be discharged more rapidly.

If, however, a logic "0" were stored on storage node 20, transistor 16 would remain in an off condition, as would voltage variable capacitor 18. Thus, the pulse applied to read enable line 13 would not be coupled to storage node 20 thereby obviating any possibility of the pulse on read enable line 13 turning on transistor 16 so as to provide a false indication of a logic "1" being stored. Thus, the voltage variable capacitor of the present invention provides a means for selectively coupling signals to an isolated node within memory cell 10. The transconductance of transistor 16 is effectively increased due to the increased voltage available at the gate thereof.

Figure 2:
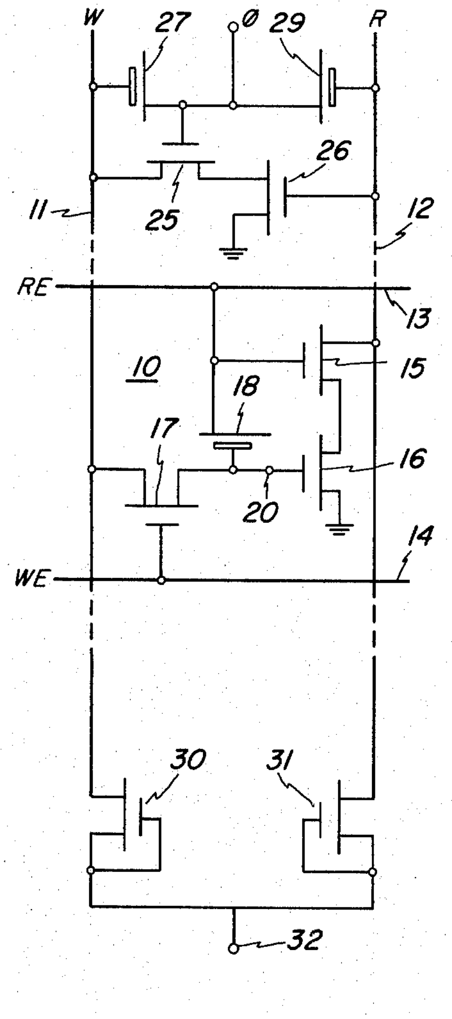
FIG. 2 illustrates another embodiment of the present invention in a three-transistor memory cell and the additional circuitry necessary for the read and refresh operation.

FIG. 2 illustrates another embodiment of the present invention wherein voltage variable capacitors are utilized in the peripheral circuitry associated with each column of memory cells in a memory array.

Specifically, in a memory array a plurality of memory cells such as memory cell 10 as illustrated in FIG. 1 are arranged in a matrix of rows and columns of cells in which write and read lines 11 and 12 respectively are shared by each memory cell in a column and wherein read enable line 13 and write enable line 14 are shared by those memory cells in the same row. Addressing a particular memory cell is accomplished by selecting a particular pair of row and column lines. This is done by conventional decoding circuitry, not illustrated in FIG. 2.

Interconnecting write line 11 and read line 12 in FIG. 2 is the refresh circuitry necessary for carrying out the REFRESH operation for that particular column in the memory array. The refresh circuitry interconnecting lines 11 and 12 comprises MOS transistors 25 and 26 series connected between write line 11 and ground. The gate of transistor 26 is coupled to read line 12 and the gate of transistor 15 is coupled to a source of transfer pulses designated $\phi$. Coupling the gate of transistor 25 to write line 11 and read line 12 are voltage variable capacitors 27 and 29 respectively. Also illustrated in FIG. 2, are precharge transistors 30 and 31 having their drains and gates connected together and connected to a source of precharge pulses from terminal 32.

Memory cell 10 operates in a manner set forth with respect to the illustration of FIG. 1. During the REFRESH operation, which can take place row by row within the memory array, the refresh circuitry at the "-head" of each column serves to read out the information stored within the particular memory cell in that column, amplify the signal representing the stored information, and return the information to the storage node.

It will be recalled that for each memory cycle, both write line 11 and read line 12 are precharged from source 32 prior to the application of a pulse on either write enable line 14 or read enable line 13. This causes voltage variable capacitors 27 and 29 to go into a high capacitance state and turns on transistor 26. Assuming a logic "1" is stored on storage node 20, voltage variable capacitor 18 is in a high capacitance state. A pulse on read enable line 13 turns on transistor 15 and is coupled to transistor 16 to increase the transconductance thereof and more rapidly discharge read line 12. With the discharge of line 12, voltage variable capacitor 19 reverts to a low capacitance state and transistor 26 is turned off. (During the READ operation, the voltage on line 12 is monitored, during the REFRESH operation it is not monitored).

When transistor 26 is turned off, the series circuit formed by the source-drain paths of transistors 25 and 26 is broken. A pulse on line $\phi$ then turns on transistor 25 in order to transfer the information from read line 12 to write line 11. Since line 11 cannot now be discharged, because transistor 26 is off, write line 11 remains charged. Since line 11 is not discharged, voltage variable capacitor 27 is in the high capacitance state. Transfer pulse $\phi$ will therefore be coupled to line 11 increasing the voltage thereof. During the pulse on line $\phi$, write enable line 14 is raised, thereby turning on transistor 17 and transferring charge from write line 11 to storage node 20 as is done during the WRITE operation. Due to the coupling of transfer pulse $\phi$, the voltage from which storage node 20 is charged is increased thereby enabling the charging of storage node 20 to be carried out more rapidly. Due to the increased amount of charge available from write line 11, the voltage on storage node 20 is increased, thus the logic "1" information on storage node 20 is refreshed and amplified.

If a logic "0" is stored on storage node 20, then voltage variable capacitor 18 and transistor 16 are in the off state. Thus a pulse on read enable line 13, turning on transistor 15, will have no effect due to the open circuit caused by transistor 16. Thus, read line 12 does not discharge, transistor 26 remains on and voltage variable capacitor 29 remains in a high capacitance state. After the termination of a pulse on read enable line 13, a transfer pulse is applied to line $\phi$ which turns on transistor 25. Now, however, both transistor 25 and transistor 26 are turned on thereby enabling the discharge of write line 11 through their series connected source-drain paths to ground. The pulse applied to line $\phi$ is coupled by voltage variable capacitor 29 to the gate of transistor 26. This coupled pulse is then additively combined with the voltage on the gate of transistor 26 to more completely turn on the transistor 26 thereby enabling the discharge of write line 11 to be carried out in a shorter interval of time. Thus, voltage variable capacitor 29 increases the transconductance of transistor 26 enabling the REFRESH operation to be carried out rapidly. After the discharge of write line 11, write enable line 14 is raised which turns on transistor 17 coupling storage node 20 to write line 11. A logic "0" is stored on storage node 20 since storage node 20 is resistively coupled to write line 11 which has no charge thereon.

Figure 3:
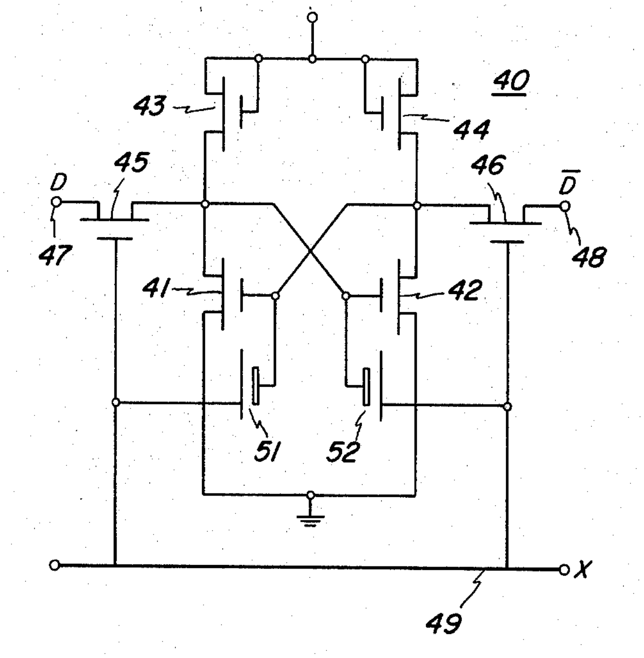
FIG. 3 illustrates another embodiment of the present invention in a flip-flop type of memory cell.

In FIG. 3 there is illustrated another embodiment of the present invention wherein the voltage variable capacitor having a separate drain is utilized to selectively couple signals within a flip-flop type of memory cell.

Specifically, memory cell 40 comprises MOS transistors 41 and 42 connected in a flip-flop configuration. That is, the gates of transistors 41 and 42 are cross-coupled, that is the gate of transistor 42 is connected to the drain of transistor 41 and the gate of transistor 41 is connected to the drain of transistor 42. The sources of transistors 41 and 42 are connected to ground. The drains of transistors 41 and 42 are connected to a source of operating potential by way of transistors 43 and 44 which act as load impedances. The gates of transistors 43 and 44 are connected to the respective drains thereof. Transistor 45 is series connected between DATA line 47 and the drain of transistor 41. Transistor 46 is series connected between $\overline{\text{DATA}}$ line 48 and the drain of transistor 42. The gates of transistors 45 and 46 are connected to access line 49, designated in FIG. 3 by the letter X. Coupling the gate of transistor 41 to access line 49 is voltage variable capacitor 51. Similarly, coupling the gates of transistors 42 to access line 49 is voltage variable capacitor 52.

The overall operation of the basic flip-flop type of memory cell is well known. Either transistor 41 or transistor 42 is in an on condition, thereby representing either a logic "0" or a logic "1". For the sake of example, it will be assumed that the storage of a logic "1" occurs when transistor 42 is on and transistor 41 is off.

Information is written upon memory cell 40 by appropriately biasing DATA and $\overline{\text{DATA}}$ lines 47 and 48. For example, in order to write a logic "1," DATA line 47 is raised in potential and $\overline{\text{DATA}}$ line 48 is maintained at or near ground potential. An enabling pulse on X line 49 turns on transistors 45 and 46. The high input from DATA line 47 is coupled to the gate of transistor 42 thereby turning it on. Turning on transistor 42 causes current to flow therethrough thereby lowering the potential on the drain thereof to below threshold voltage. This lowered voltage serves to insure that transistor 41 is in the off condition, thereby isolating the drain thereof from ground potential. If memory cell 40 were already in the logic "1" state, then the application of logic "1" write signals to the inputs thereof would have no effect on the state of the cell. If, however, a logic "0" were stored in memory cell 40, then the switching operation as described above is carried out.

Voltage variable capacitors 51 and 52 serve to selectively enhance the voltages on the gates of transistors 41 and 42 during readout. By increasing the voltage of the signals applied to these gates, the transconductance of either transistor 41 or transistor 42 is increased thereby increasing the current flow through one of these transistors, giving a higher READ current.

During the READ operation, the outputs from DATA and $\overline{\text{DATA}}$ lines 47 and 48 are monitored by suitable peripheral equipment and an enabling pulse is applied on access line 49. Assuming a logic "1" has been stored, then transistor 41 is in an off state and transistor 42 is in an on state. The enabling pulse on line 49 is coupled to the gate of transistor 42 by voltage variable capacitor 52, which is in the high capacitance state, thereby turning transistor 42 on more strongly.

When a pulse is applied on access line 49, the pulse is coupled by the large capacitance exhibited by voltage variable capacitor 52 to the gate of transistor 42, thereby increasing the current therethrough. The increase in current through transistor 42 further increases the current through $\overline{\text{DATA}}$ line 48.

Since transistor 42 is in an on state, the voltage on the gate of transistor 41 and voltage variable capacitor 51 is below threshold, thereby maintaining these devices in an off condition. Since voltage variable capacitor 51 is in an off condition, very little of the voltage pulse applied to access line 49 is coupled to the gate of transistor 41. Thus, transistor 41 remains in an off condition.

As can be seen from the embodiment of FIG. 3, the voltage variable capacitors enable one to selectively couple enabling signals from one point in a circuit to an isolated node within the circuit. The effect of the voltage variable capacitors is to enhance the desired response to the enabling signals. For example, as described in FIG. 3, voltage variable capacitor 52 couples the enabling signal on access line 49 to the gate of transistor 42 thereby turning it on more fully so as to provide a greater read signal.

In carrying out the present invention, either p-channel or n-channel MOS devices may be used. For p-channel devices, a "high amplitude" signal is a large negative voltage. For n-channel MOS devices, a "high amplitude" signal is a large positive voltage. Further, the present invention contemplates the voltage variable capacitor as coupling between an access or signal supply line and an isolated node within the circuit. This ability to couple two separate points within a circuit arises from the separate drain utilized with the voltage variable capacitor. That is, in the present invention, the voltage variable capacitor does not have both of its leads connected to the same host transistor for increasing the transconductance of that transistor.

While a preferred embodiment of the present invention has been shown and described, it will be apparent to those skilled in the art that various modifications can be made within the spirit and scope of the present invention.

What we claim as new and desire to secure by Letters Patent of the United States is:

1. Apparatus for selectively increasing the transconductance of MOS transistors in a circuit comprising:

a gate structure connected to a gate of one of said MOS transistors;

a drain electrode, partially underlying said gate structure, and connected to the gate of another of said MOS transistors;

an isolated node to which signals must be selectively coupled, said gate structure being connected to said isolated node;

means for applying signals to said isolated node to activate the capacitor formed by said gate structure and said drain electrode; and means for applying enabling signals to said drain electrode, whereby said enabling signals are coupled to the gate of said one of said MOS transistors to increase the transconductance thereof.

2. Apparatus as set forth in claim 1 wherein said isolated node comprises the storage node of an MOS memory cell formed by the gate of said one of said MOS transistors; and said drain electrode is connected to the gate of another of said MOS transistors.

3. Apparatus as set forth in claim 1 wherein:

said isolated node comprises an isolated access line to said circuit.

4. Apparatus as set forth in claim 1 wherein:

said circuit comprises a flip-flop memory cell comprising two MOS transistors having cross-coupled gates, one of said gates forming said isolated node; and said means for applying enabling signals comprises an access line connected to said separate drain electrode.

5. An improved MOS memory cell containing two pairs of access lines and three MOS transistors, the first and second of said transistors being series connected between one of a first pair of access lines and ground, the third of said transistors being connected between the other of said first pair of access lines and the gate of said first transistor, the gate of said second transistor being connected to one of said second pair of access lines and the gate of said third transistor connected to the other of said second pair of access lines; wherein the improvement comprises:

an MOS voltage variable capacitor, containing a drain and a gate structure partially overlying said drain, connected between the gates of said first and second transistors.

6. An improved MOS memory cell as set forth in claim 5 wherein the gate of said first transistor forms the storage node of the memory cell and wherein the gate of said voltage variable capacitor is connected to said storage node.

* * * * *